(12) United States Patent
Yanase et al.

(10) Patent No.: US 7,120,918 B2
(45) Date of Patent: Oct. 10, 2006

(54) DISK RECORDING AND PLAYBACK DEVICE IN WHICH THE DISK IS HELD VERTICALLY IN THE DEVICE

(75) Inventors: Yasuo Yanase, Osaka (JP); Yoshiaki Kanamori, Suita (JP)

(73) Assignees: Sanyo Electric Co., Ltd., Moriguchi (JP); Sanyo Technosound Co., Ltd., Daito (JP)

( * ) Notice: Subject to any disclaimer, the term of this patent is extended or adjusted under 35 U.S.C. 154(b) by 316 days.

(21) Appl. No.: 10/788,470

(22) Filed: Mar. 1, 2004

(65) Prior Publication Data
US 2004/0177362 A1  Sep. 9, 2004

(30) Foreign Application Priority Data
Mar. 6, 2003  (JP) ............................. 2003-059294

(51) Int. Cl.
*G11B 17/46* (2006.01)

(52) U.S. Cl. ..................................... 720/612
(58) Field of Classification Search ................ 720/612; 369/75.21; 360/99.06, 99.02
See application file for complete search history.

(56) References Cited

U.S. PATENT DOCUMENTS 4,969,140 A * 11/1990 Koiwa et al. ............... 720/621
5,016,236 A * 5/1991 Cho ............................ 720/605
5,187,700 A * 2/1993 Yoon ........................... 720/612

FOREIGN PATENT DOCUMENTS

JP    11-185335    7/1999
JP    11-273218    10/1999

\* cited by examiner

*Primary Examiner*—Julie Anne Watko
(74) *Attorney, Agent, or Firm*—Armstrong, Kratz, Quintos, Hanson & Brooks, LLP (57) ABSTRACT

A holder, into which a disk is inserted from above and having an opening in its lower portion, is provided in the interior of a panel whose lower end is supported pivotably on a chassis. The panel is provided so as to translatable between a first position in which with the panel closed from an open position the holder comes into contact with the chassis and a center hole in the disk is brought near the fore-end of a turntable, and a second position in which with the panel further closed from the first position with the holder being in contact with the chassis, the disk is fitted onto the turntable. The stop is supported pivotably on the panel, and its free-end enters a lower portion of the holder so as to receive the disk. The chassis is provided with a protuberance for pivoting the stop in a direction in which, in association with the panel pivoting from the first position to the second position, that the stop comes out of abutment with the disk.

4 Claims, 9 Drawing Sheets

DISK RECORDING AND PLAYBACK DEVICE IN WHICH THE DISK IS HELD VERTICALLY IN THE DEVICE

BACKGROUND OF THE INVENTION

1. Field of the Invention

The present invention relates to devices for disk recording/playback with the disk held vertically.

2. Description of Related Art

Figure 12:
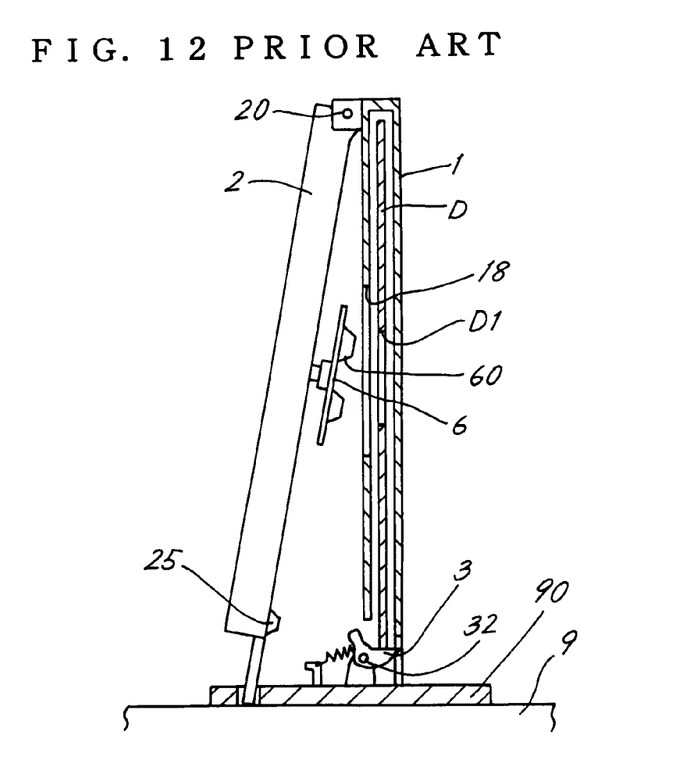
FIG. 12 is a side view of a conventional disk record/playback device, with the panel in the open state.
Figure 13:
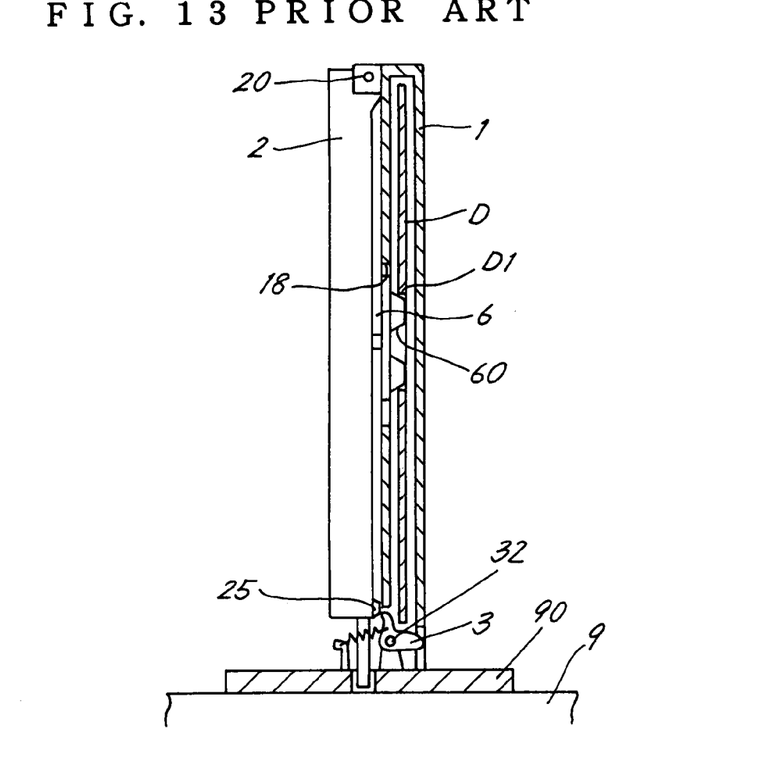
FIG. 13 is a side view of a conventional disk record/playback device, with the panel in the closed state.

FIGS. 12 and 13 are side cross-sectional views illustrating a device for recording onto/playing back from a disk D in an upright position (see Japanese Laid-Open Pat. App. Pub. No. 11-273218). In this device, a panel 2 on which a turntable 6 is fitted is supported on a pivot 20 in an upper end of a chassis 1 as a case, in which the disk D is inserted in an upright posture. The chassis 1 is fixed on a base 9, and the panel 2 is rotated by the shifting of a cam plate 90 on the base 9. A surface of the chassis 1 that opposes the turntable 6 has an opening 18, and the turntable 6 fits into a center hole D1 in the disk D through the opening 18.

The lower end of the chassis 1 has an opening, through which a stop 3 enters the lower end portion of the chassis 1 in order to support the lower end of the disk D; the stop 3 is spring-urged and is supported on a pivot 32 on the base 9. The panel 2 is furnished with a protuberance 25, which comes into contact with the stop 3.

When inserting the disk D into the chassis 1, the user opens the panel 2, as shown in FIG. 12. The turntable 6 comes apart from the chassis 1, and the stop 3 catches the lower end of the disk D.

Under this condition, the cam plate 90 is shifted to close the panel 2. Because the disk D is supported by the stop 3 and its position with respect to height is determined, the turntable 6 accurately fits into the center hole D1 in the disk D through the opening 18. Thereafter, as shown in FIG. 13, the protuberance 25 of the panel 2 pushes the stop 3 to rotate it clockwise. The stop 3 comes apart from the lower end of the disk D so that the disk D can spin. It should be noted that a damper (not shown), which clamps the disk D between it and the turntable 6, is furnished flanking the chassis 1 on the side opposite the panel 2.

Figure 11:
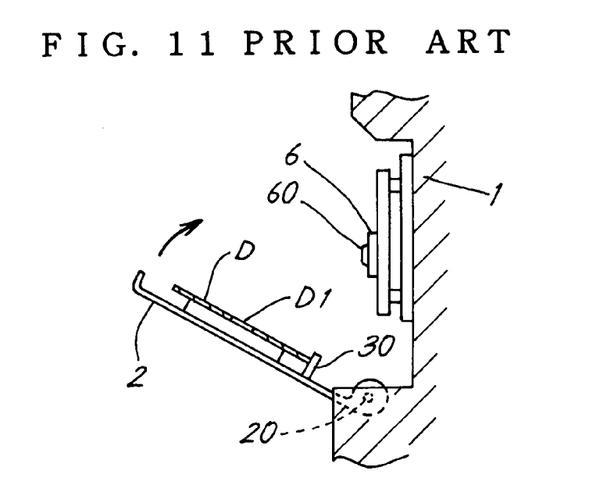
FIG. 11 is a side view of a conventional disk record/playback device.

Meanwhile, a disk record/playback device as shown in FIG. 11 has been proposed in recent years, taking design appearance into consideration (see, for example, Japanese Laid-Open Pat. App. Pub. No. 11-185335). In this device, the lower end of the panel 2 is supported on a pivot 20 on the chassis 1, and a turntable 6 for rotating a disk D in an upright position is furnished on the chassis 1. The disk D is placed on the back face of the panel 2 so that the disk D fits on the turntable 6 when the panel 2 is closed against the chassis 1.

Nevertheless, merely placing the disk D on the panel 2 may cause the disk D to fall off from the panel 2 when the panel 2 being pivoted, and for this reason, a catch 30 is furnished on the back face of the panel 2 for supporting the lower end of the disk D. The turntable 6 is formed with, as is well-known, a sloping face 60 where its fore-end part is tapered, and when the panel 2 is closed, the circumference of the center hole D1 in the disk D makes contact with the sloping face 60. Thus, the disk D is slightly lifted and comes apart from the catch 30 so that the disk D can rotate.

Figure 14:
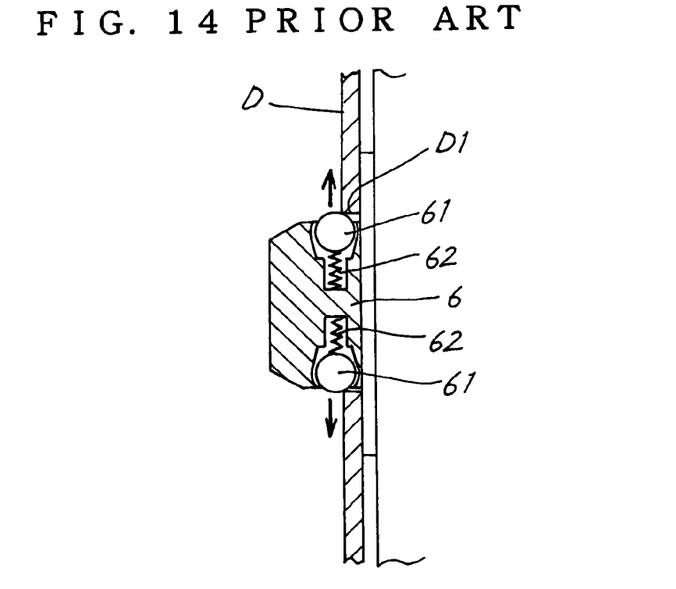
FIG. 14 is a cross-sectional view illustrating a ball chuck structure.

In this case, it is conceivable to structure the turntable 6 with a ball chuck so that the disk D can be mounted by hand directly onto the turntable 6. The structure of the ball chuck is as shown in FIG. 14, in which balls 61 provided within the side face of the turntable 6 are urged outward with compression springs 62 so that the balls 61 come into the center hole D1 in the disk D to hold the disk D. Mounting the disk D by hand, however, risks scratching the disk's signal surface. For this reason, from the viewpoint of protecting the disk's signal surface, the configuration illustrated in FIG. 11 is adopted.

In the device illustrated in FIG. 11, the amount of lifting of the disk should be made large for the disk D to be lifted to come apart reliably from the catch 30. This, however, requires that the sloping face 60 be lengthened. This would increase the height of the turntable 6, leading to enlargement in the front-to-rear device thickness.

In view of this point, another conceivable configuration is that the stop 3 as illustrated in FIGS. 12 and 13 is attached as it is to the lower end of the panel 2 in the FIG. 11 configuration. However, when closing the panel 2 in such a configuration, the stop 3 disengages first and the disk D thereafter fits on the turntable 6 due to the fact that the panel 2 is supported on the pivot 20 on its lower end. This causes the disk D to fall off from the panel 2. In other words, with the configuration as illustrated in FIGS. 12 and 13, what makes it possible to disengage the stop 3 from the disk D after the disk D has been fitted onto the turntable 6 is the fact that the panel 2 is supported pivotably on the pivot at the upper end of the chassis 1. If the configuration as illustrated in FIGS. 12 and 13 is adapted as it is to a device in which the lower end of the panel 2 is supported pivotably on the pivot 20 on the chassis 1, it is impossible to obtain the effect of holding the disk D accurately until the disk fits onto the turntable 6.

BRIEF SUMMARY OF THE INVENTION

An object of the present invention is, in a device in which the lower end of the panel 2 that supports a disk is supported on the pivot 20 on the chassis 1 and recording/playing back is carried out with a disk being in an upright position, to prevent the front-to-rear thickness of the device from increasing.

A holder 4, into one end of which a disk D is inserted and the other end of which has an opening, is provided in the interior of a panel 2 the lower end of which is supported on a pivot 20 on a chassis 1.

The panel 2 is provided so as to be translatable between a first position in which with the panel closed from its open position, the holder 4 comes into contact with the chassis 1 and a center hole D1 in the disk D is brought near the fore-end of the turntable, and a second position in which with the panel further closed from the first position with the holder 4 being in contact with the chassis 1, the disk D is fitted onto the turntable 6.

The stop 3 is supported pivotably on the panel 2, and its free-end enters the other end of the holder 4 to receive the disk D.

Between the stop 3 and the chassis 1, a release mechanism is provided for pivoting the stop 3 in a direction in which, in association with the panel pivoting from the first position to the second position, the stop 3 comes out of abutment with the disk D. Hereinbelow, the operations will be described.

When the Panel is Opened

The disk D is inserted from the top of the holder 4 provided in the interior of the panel 2. The disk D is received by the stop 3 at its lower end. Because of the provision of the holder 4, the disk D does not fall off from the panel 2.

First Position of the Panel

When the panel 2 is closed and the panel 2 reaches the first position, the holder 4 makes contact with the chassis 1. The center hole D1 in the disk D is brought near the fore-end of the turntable 6. The disk D is received by the stop 3 at its lower end, and the center hole D1 in the disk D is substantially at the same height as is the fore-end of the turntable 6.

Second Position of the Panel

Even with the panel 2 closed further from the first position, the holder 4 does not move because the holder 4 is in contact with the chassis 1. Because of the closing operation of the panel 2, the disk D is fitted onto the turntable 6. The stop 3 comes out of abutment with the disk D by means of a releasing mechanism, so that the disk D can spin without scraping on the stop 3.

Accordingly, without enlarging the sloping face 60 of the turntable 6, the disk D can make apart from the stop 3 and fit onto the turntable 6 reliably, and it is possible to prevent an increase in the front-to-rear thickness of the device.

DETAILED DESCRIPTION OF THE PREFERRED EMBODIMENTS

One embodiment of the present invention is detailed below with reference to the drawings.

Figure 1:
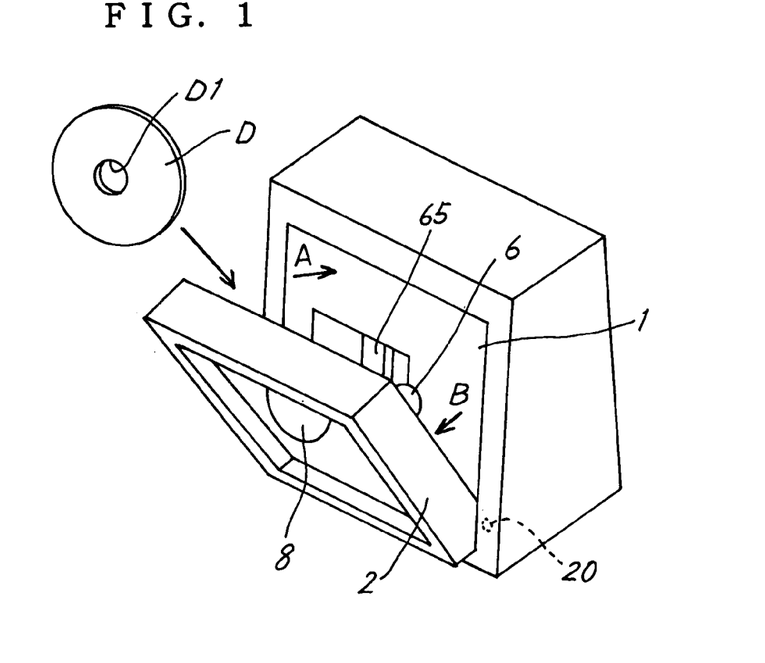
FIG. 1 is an oblique view of a disk record/playback device, illustrating the state in which the panel is opened.
Figure 2:
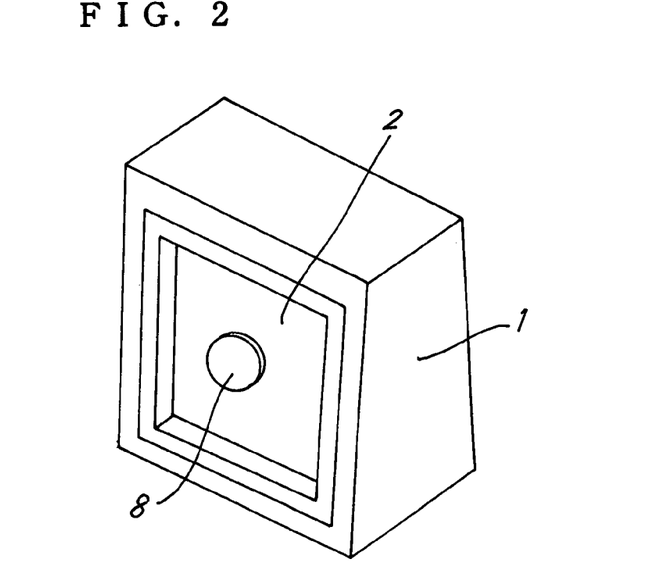
FIG. 2 is an oblique view of the disk record/playback device, in turn illustrating the state in which the panel is closed.

FIGS. 1 and 2 are perspective views illustrating a disk record/playback device. FIG. 1 illustrates a state in which a panel 2 is open, whereas FIG. 2 illustrates a state in which it is closed. A lower end of the panel 2 is supported on a pivot 20 on a chassis 1, on which a turntable 6 and a pickup 65 are mounted. In the state in which the panel 2 is closed, the back face of the panel 2 is located in substantially the same plane as the front face of the chassis 1. The disk D is inserted inside the panel 2 with the panel 2 being open.

Figure 3:
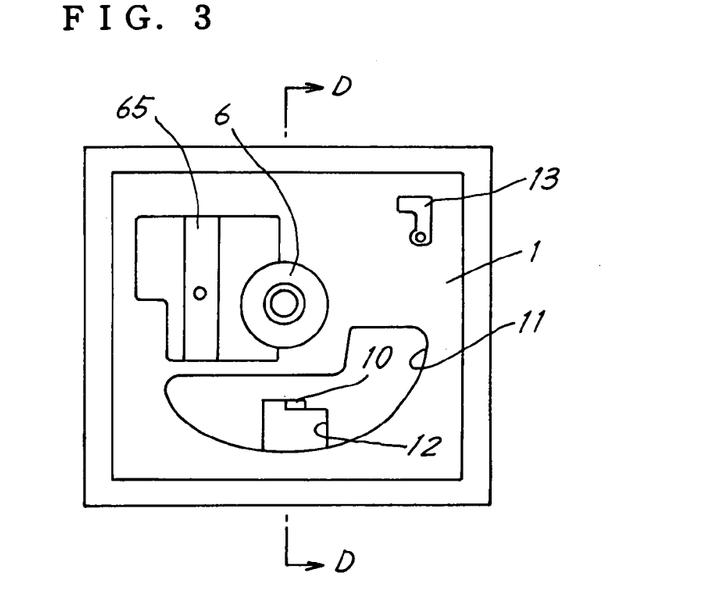
FIG. 3 is a view illustrating the front face of the chassis, viewed in the direction A shown in FIG. 1.
Figure 4:
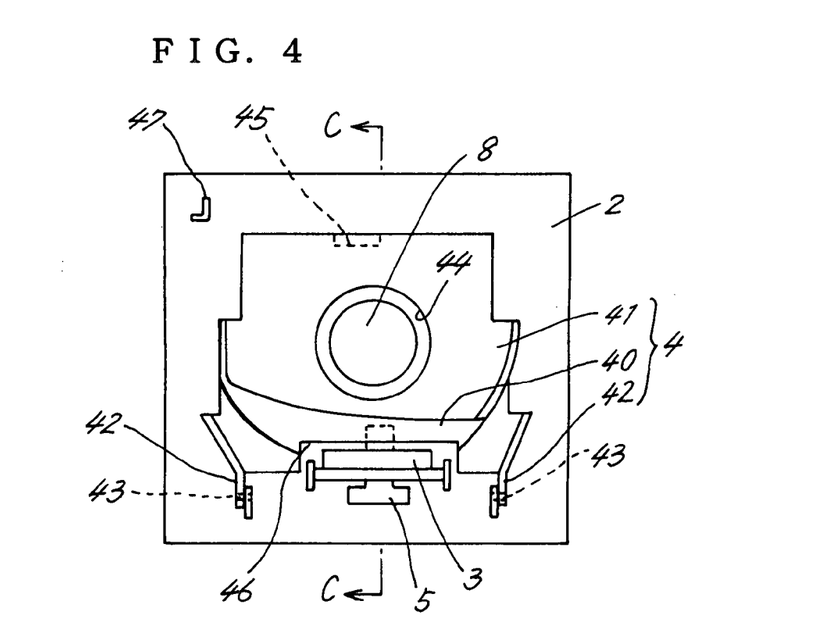
FIG. 4 is a view illustrating the panel, viewed in the direction B shown in FIG. 1, that is, viewed from its rear side.

FIG. 3 illustrates the front face of the chassis 1, viewed in the direction A indicated in FIG. 1, and FIG. 4 illustrates the panel 2, viewed in the direction B indicated in FIG. 1, that is, viewed from the rear. The chassis 1 is furnished with a lock lever 13, and a holder 4 with a hook piece 47. With the panel 2 being closed, the lock lever 13 engages with the hook piece 47 so that the panel 2 is locked to the chassis 1.

On the chassis 1 illustrated in FIG. 3, a first recessed surface 11 is formed underneath the turntable 6, and a second recessed surface 12 that is deeper than the first recessed surface 11 is formed within the first recesses surface 11. A protuberance 10 for pivoting a later-described stop 3 is provided on the first recessed surface 11, along the upper edge portion of the second recessed surface 12.

As shown in FIG. 4, the back face of the panel 2 is furnished with the holder 4 into which a disk D is inserted from above. The holder 4 comprises: a wall plate 41 opposing the panel 2; a pocket part 40 provided in a lower portion of the wall plate 41 and having an opening in its lower end; and leg pieces 42, 42 arranged below the pocket part 40 and supported on a pivot 43 on the panel 2.

With the disk D inserted into the pocket part 40, the disk edge is received by the surrounding wall of the pocket part 40. In the lower end of the pocket part 40 a notch 46 is formed, and the stop 3 is supported pivotably on the holder 4 within the notch 46.

Figure 5:
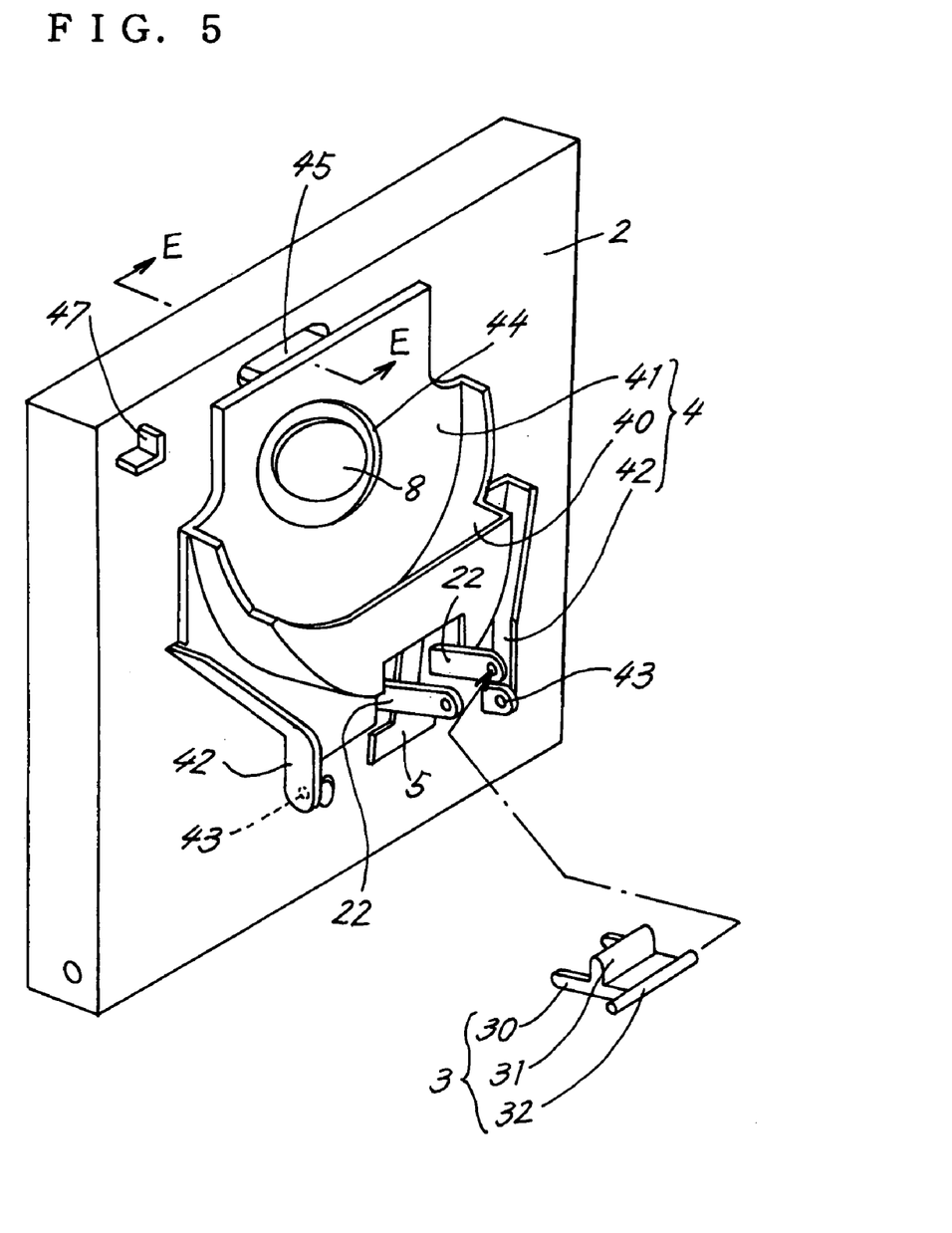
FIG. 5 is an oblique view of the panel and a stop.

FIG. 5 is an oblique view of the panel 2 and the stop 3. The stop 3 is furnished unitarily with a pivot shaft 32, catch pieces 30 extending from the pivot shaft 32 toward the panel 2, and a presser piece 31 extending upward from substantially the longitudinal center of the catch 30. The catch pieces 30 catch the lower end of the disk D that is exposed from the opening in the lower face of the pocket part 40. The pivot shaft 32 rotatably fits in projecting pieces 22, 22 projecting from the panel 2, and a torsion spring (not shown) for pressing the catch pieces 30 against the lower end of the disk D is fitted on the pivot shaft 32.

Figure 6:
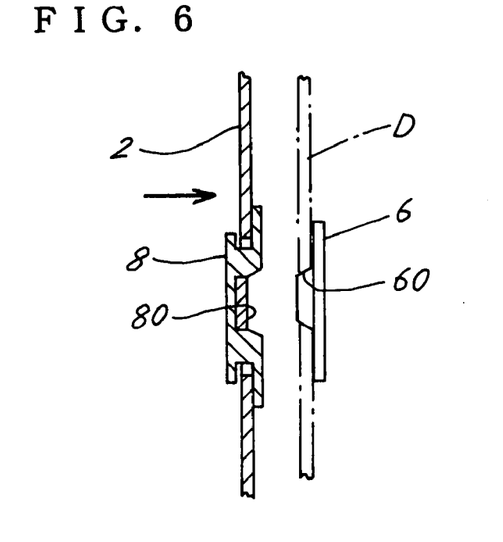
FIG. 6 is a cross-sectional view of a clamper.

In an upper portion of the wall plate 41, a round hole 44 is formed so that a damper 8 attached to the panel 2 is exposed through the round hole 44. The damper 8 is, as shown in FIG. 6, furnished so as to be slightly shiftable along the open/close directions of the panel 2, and a magnet 80 is provided in the interior. With the panel 2 being closed, the magnet 80 attracts the turntable 6, which is made of metal, and the attraction force effects the clamping of the disk D. The configuration of the damper 8 is known, and the description and graphical illustration of the damper 8 are omitted from what is set forth.

Figure 7:
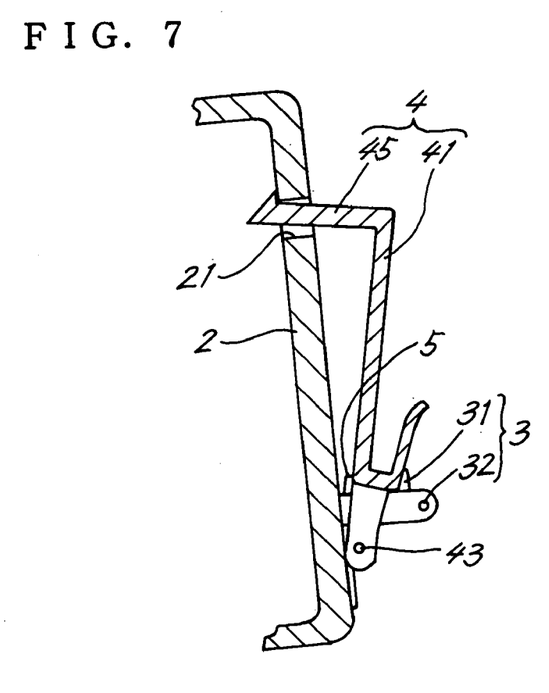
FIG. 7 is a cross-sectional view taken along line E—E in FIG. 5.

As shown in FIG. 5, a flat spring 5 is attached on the panel 2 and behind the stop 3. The fore-end of the flat spring 5 is in contact with the wall plate 41 and pushes the holder 4 in a direction such that it moves away from the panel 2, with the pivotal axis 43 being the center. FIG. 7 is a cross-sectional view taken along the line E—E in FIG. 5. A claw piece 45 is provided extending from the upper end of the wall plate 41, and the claw piece 45 hooks on the panel 2 through a hole 21 formed in the panel 2. As a result, the holder 4 is kept in a position such that it is slightly tilted with it being pushed by the flat spring 5, so that the holder 4 does not rattle when the panel 2 is opened/closed.

Figure 8:
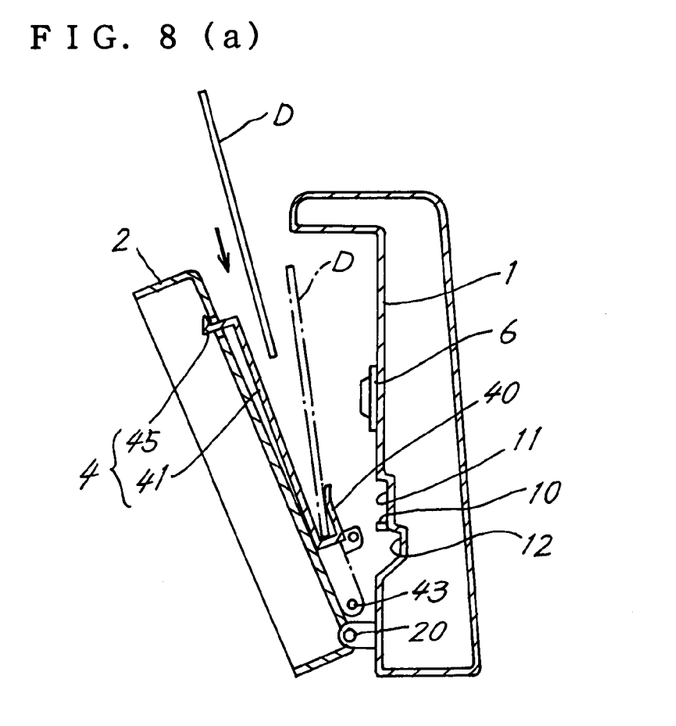
FIGS. 8(a) and 8(b) are cross-sectional views illustrating the panel in the open state.
Figure 9:
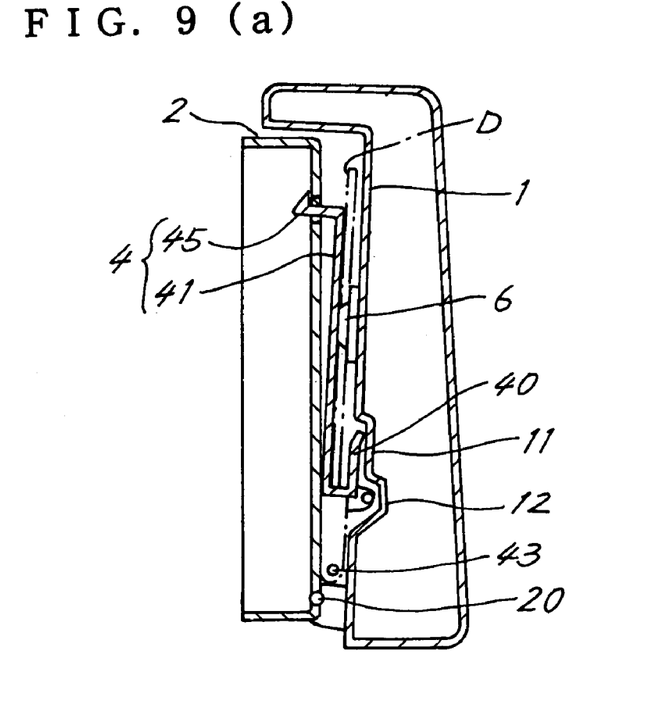
FIGS. 9(a) and 9(b) are cross-sectional views illustrating the panel in the closed state.
Figure 10:
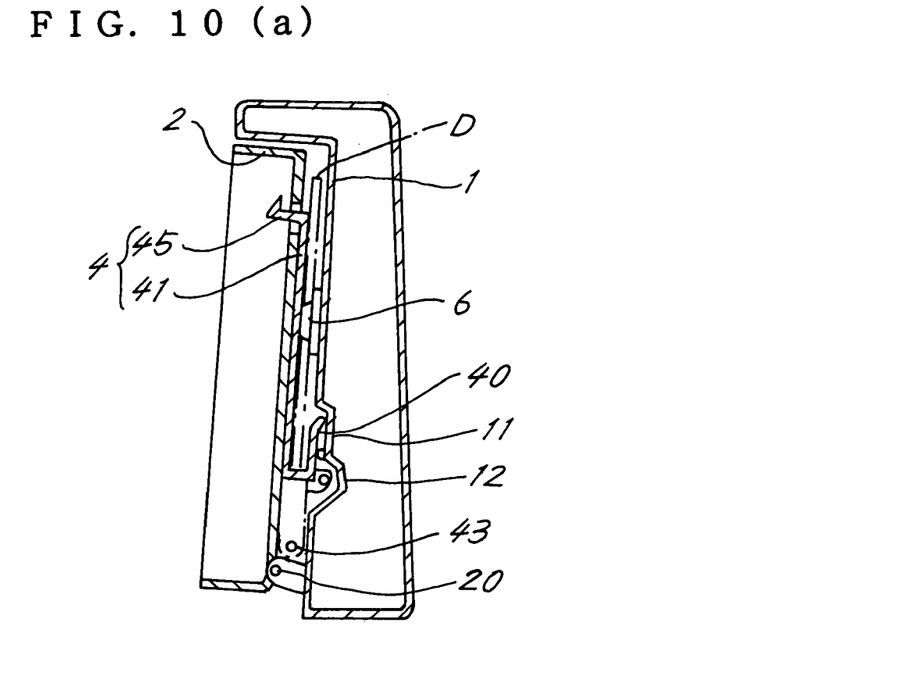
FIGS. 10(a) and 10(b) are cross-sectional views illustrating the panel in the closed state.

The following describes an operation for closing the panel 2. FIGS. 8 through 10 are cross-sectional views representing open/close operations of the panel 2, in which the chassis is sectioned along the line D—D in FIG. 3 and the panel 2 along the line D—D in FIG. 4.

When the Panel is Opened

As shown in FIG. 8(a), the disk D is inserted from above the holder 4 with the panel 2 being open. The holder 4 is, as described previously, slightly tilted with the claw piece 45 hooked on the panel 2. Because the surrounding wall of the holder 4 catches the disk edge, the disk D does not fall off from the panel 2 even if it is tilted in the holder 4, as represented by the dash-dotted line in FIG. 8(a).

As illustrated in FIG. 8(b), the lower end of the disk D is caught by the catch pieces 30 of the stop 3.

Operation for Closing the Panel

When the panel 2 is closed by hand, the pocket part 40 of the holder 4 reaches a first position at which it comes into contact with the first recessed surface 11 of the chassis 1, as shown in FIG. 9(a). Thus, further movement of the holder 4 toward the chassis 1 is restricted. As shown in FIG. 9(b), the pivot shaft 32 of the stop 3 is located inside the second recessed surface 12. The presser piece 31 of the stop 3 nears the protuberance 10 on the chassis 1. In this state, the disk D nears the fore-end of the turntable 6. The lower end of the disk D is held by the stop 3, and the center hole D1 in the disk D is approximately at the same height level as is the fore-end of the turntable 6. This enables the turntable 6 to easily fit into the center hole D1 in the disk D.

In the first position, with the disk D brought near the fore-end of the turntable 6 by the pocket part 40 coming in contact with the chassis 1, the protuberance 10 does not yet turn the stop 3.

The panel 2 is then further closed as shown in FIG. 10(a). Since the holder 4 is in contact with the chassis 1, the holder 4 does not move. The panel 2 is pressed against the flat spring 5, permitting the claw piece 45 of the holder 4 to come apart from the panel 2. By further closing the panel 2, the damper 8 moves toward the turntable 6 through the round hole 44, and the disk D is clamped by the damper 8 and the turntable 6. The lock lever 13 engages with the hook piece 47, and the panel 2 reaches a second position in which it is locked to the chassis 1.

By still further closing the panel 2 as shown in FIG. 10(b), the protuberance 10 on the chassis 1 pushes the presser piece 31 of the stop 3 so as to rotate the stop 3 anticlockwise with the pivot shaft 32 being the center. The catch piece 30 comes off from the lower end of the disk D. It will be readily understood that the catch piece 30 comes off from the lower end of the disk D after the center hole D1 in the disk D has fitted onto the sloping face 60 of the turntable 6. This permits the disk D to spin.

As described above, in the device of the present example, the disk D can be detached from the stop 3 and be mounted reliably on the turntable 6 without the sloping face 60 of the turntable 6 being elongated as has been conventional. This prevents the front-to-rear thickness of the device from increasing. In addition, it is unnecessary to mount the disk D directly on the turntable 6 by hand, and therefore, the disk's signal surface is prevented from being scratched when mounting the disk D.

To open the panel 2, the lock between the panel 2 and the chassis 1 is released. Due to the urging force of the flat spring 5, the panel 2 slightly opens, resulting in a state as represented in FIG. 9(a). The presser piece 31 of the stop 3 detaches from the protuberance 10, and the torsion spring fitted to the pivot shaft 32 brings the catch 30 into contact with the lower end of the disk D. The disk D does not fall off from the holder 4 even when it comes apart from the turntable 6. The disk D in the holder 4 can be taken out by opening the panel 2 is by hand.

It should be noted that in the foregoing example, the turntable 6 is provided on the chassis 1 while the panel 2 is provided with the damper 8. Nevertheless, the chassis 1 may be provided with the damper 8 while the panel 2 is provided with the turntable 6. In addition, the holder 4 may have any shape insofar as it can receive the circumferential edge of the disk D.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A disk record/playback device comprising:

a chassis for holding a disk;

a panel whose lower end is pivotably supported on the chassis;

a turntable provided on the panel or on the chassis, for fitting into the central portion of the disk;

a stop for receiving the disk edgewise to bring a center hole in the disk and the fore-end of the turntable into opposition, and with the disk being mounted on the turntable, for coming out of edgewise abutment with the disk; wherein provided inside the panel is a holder through one end of which the disk is inserted and in the other end of which is an opening;

the panel is provided so as to be translatable between a first position in which with the panel closed from its open position, the holder comes into contact with the chassis and the center hole in the disk is brought near the fore-end of the turntable, and a second position in which with the panel further closed from the first position with the holder being in contact with the chassis, the disk is fitted onto the turntable;

the stop is supported pivotably on the panel, and its free end enters the other end of the holder to receive the disk; and provided between the stop and the chassis is a release mechanism for pivoting the stop in a direction in which, in association with the panel pivoting from the first position to the second position, the stop comes out of abutment with the disk.

2. A disk record/playback device as set forth in claim 1, wherein the release mechanism includes a protuberance provided on the chassis for coming into contact with the stop.

3. A disk record/playback device as set forth in claim 1, further comprising a damper provided on the panel, wherein in association with the panel pivoting from the first position to the second position, the damper clamps the disk between itself and the turntable on the chassis.

4. A disk record/playback device comprising:

a chassis for holding a disk;

a panel whose lower end is pivotably supported on the chassis in which inside the panel a holder is provided;

a turntable provided on the panel or on the chassis, for fitting into the central portion of the disk;

a stop for receiving the disk edgewise to bring a center hole in the disk and the fore-end of the turntable into opposition, and with the disk being mounted on the turntable, for coming out of edgewise abutment with the disk; wherein the panel is provided so as to be translatable between a first position in which the center hole in the disk is brought near the fore-end of the turntable, and a second position in which the disk is fitted onto the turntable;

the stop is supported pivotably on the panel, and a free end thereof enters a lower end of the holder to receive the disk;

the chassis is furnished with a release mechanism for pivoting the stop in a direction in which, in association with the panel pivoting from the first position to the second position, the stop comes out of abutment with the disk.

* * * * *